(12) United States Patent
Smith

(10) Patent No.: US 6,315,908 B1
(45) Date of Patent: Nov. 13, 2001

(54) METHOD FOR TREATMENT OF WASTE WATER

(75) Inventor: George A. Smith, Austin, TX (US)

(73) Assignee: Huntsman Petrochemical Corporation, Austin, TX (US)

( * ) Notice: Subject to any disclaimer, the term of this patent is extended or adjusted under 35 U.S.C. 154(b) by 0 days.

(21) Appl. No.: 09/502,878

(22) Filed: Feb. 11, 2000

Related U.S. Application Data
(60) Provisional application No. 60/119,649, filed on Feb. 11, 1999.

(51) Int. Cl.$^7$ .................................................. B01D 17/04
(52) U.S. Cl. .......................... 210/708; 210/735; 516/168
(58) Field of Search ............................. 516/168; 210/705, 210/708, 711, 728, 735

(56) References Cited

U.S. PATENT DOCUMENTS

| | | | |
|---|---|---|---|
| 4,089,803 | * | 5/1978 | Bessler ................................. 516/164 |
| 4,382,852 | * | 5/1983 | McCoy et al. ....................... 210/708 |
| 4,396,499 | * | 8/1983 | McCoy et al. ....................... 210/708 |
| 4,439,345 | * | 3/1984 | Duke .................................... 516/141 |
| 4,626,379 | * | 12/1986 | Buriks et al. ........................ 516/168 |
| 5,763,506 | * | 6/1998 | Papalos et al. ...................... 523/414 |
| 6,153,106 | * | 11/2000 | Kelley et al. ....................... 210/698 |

FOREIGN PATENT DOCUMENTS

| | | |
|---|---|---|
| 0 517 167 A2 | 6/1992 | (EP) . |
| WO 97/35067 | 9/1997 | (WO) . |

\* cited by examiner

*Primary Examiner*—Daniel S. Metzmaier
(74) *Attorney, Agent, or Firm*—O'Keefe, Egan & Peterman LLP

(57) ABSTRACT

This invention concerns a method for the treatment of waste-water. This method includes reacting a polyamine and a multifunctional epoxide in waste-water composition that initially is in the form of an emulsion to form a reaction product that causes the emulsion to break into a water phase and an oil phase. The oil phase and water phase may thereafter be physically separated from one another as by dissolved air flotation or chemical precipitation.

13 Claims, 1 Drawing Sheet

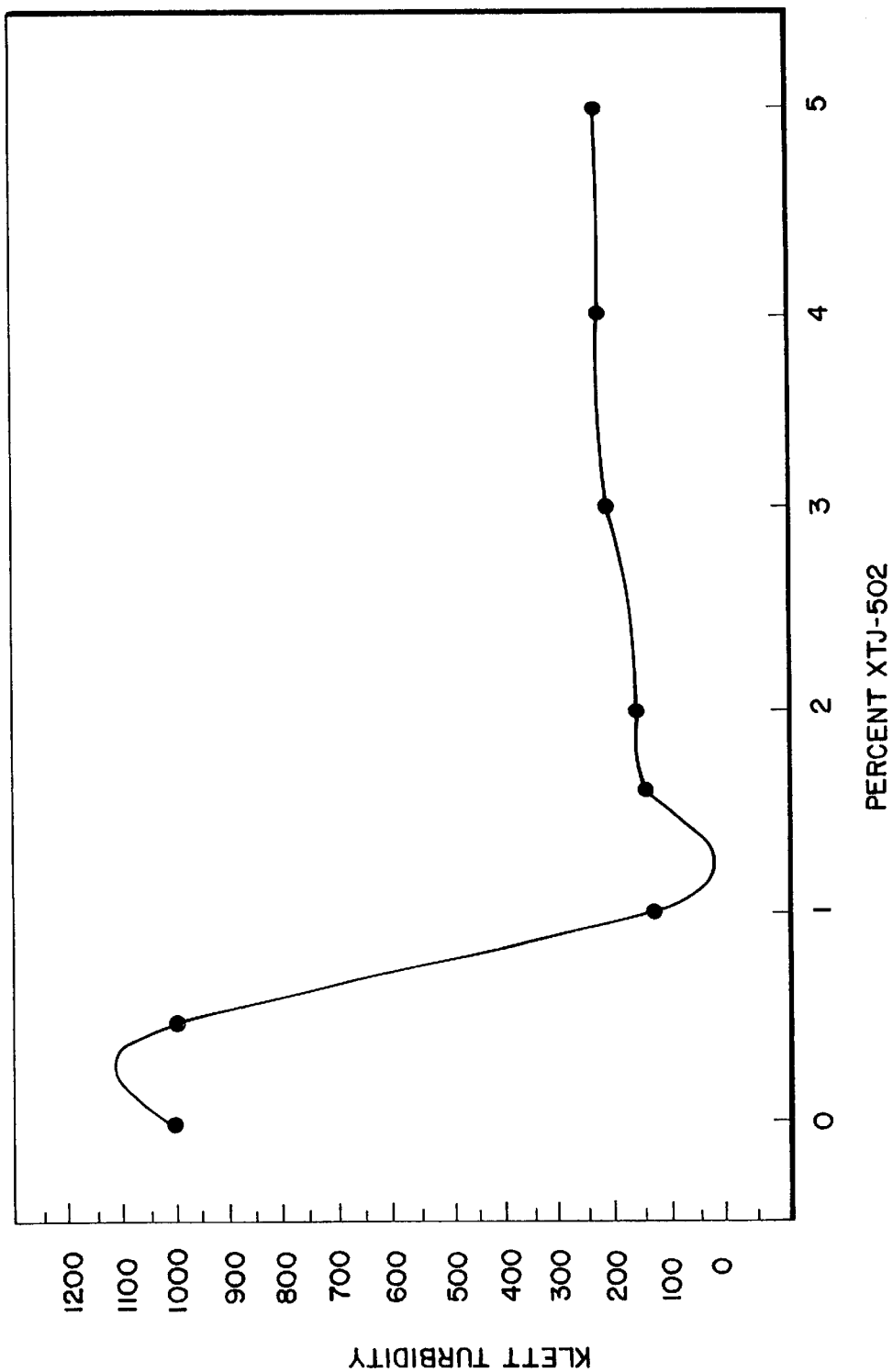
FIGURE

METHOD FOR TREATMENT OF WASTE WATER

This application claims priority to provisional application serial No. 60/119,649, filed Feb. 11, 1999.

BACKGROUND OF INVENTION

This invention concerns a method for the treatment of waste water using the reaction product of a polyetheramine and a multifunctional epoxide formed in situ to cause flocculation to thereby break a water/oil emulsion.

The use of polyamines to treat industrial laundry wastewater is known. It is believed that the positive charge on the polymer interacts with the negative charge on the wastewater emulsion droplets causing destabilization. This causes the emulsion to break so that the oil phase can be removed by dissolved air flotation (DAF) or chemical precipitation (CP).

Polyamines are typically prepared by reacting primary and secondary amines with epichlorohydrin. Use of secondary amines results in quaterization so the charge density can be controlled by the ratio of primary to secondary amine.

SUMMARY OF INVENTION

The present invention provides a solution to one or more of the disadvantages and deficiencies described above.

There are numerous polyetheramines that can be used in the practice of this invention. The polyetheramines used in this invention include monoamines, diamines and triamines, having a molecular weight of from about 150 to about 12,000, typically from about 150 to about 5,000, and in one embodiment from about 150 to about 3,000, such chemicals including but not limited to hydroxyl, amine, and aminoalcohol functionalized polyether materials. Preferred polyetheramines have a molecular weight of from about 1,000 to about 3,000. Suitable monoamines include JEFFAMINE™ M-1000, JEFFAMINE™ M-2070, and JEFFAMINE™ M-2005. Suitable diamines include JEFFAMINE™ ED-6000, JEFFAMINE™ ED-4000, JEFFAMINE™ ED-2001 including XTJ-502 and TXJ-418, JEFFAMINE™ D-2000, JEFFAMINE™0 D-4000, JEFFAMINE™ ED-900, JEFFAMINE™ ED-600, and JEFFAMINE™ D-400. Suitable triamines include JEFFAMINE™ ET-3000, JEFFAMINE™ T-3000 and JEFFAMINE™ T-5000. See the glossary for structures of these polyetheramines. Certain polyetheramines are of formula I:

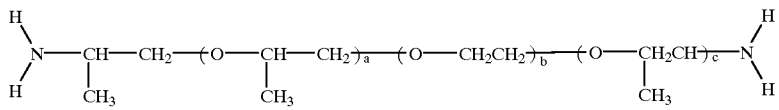

In one broad respect, this invention is a method for the treatment of waste-water, which comprises: reacting a polyetheramine and a multifunctional epoxide in waste-water composition that initially is in the form of an emulsion to form a reaction product that causes the emulsion to break into a water phase and an oil phase. This method may include separating the water phase from the oil phase after the emulsion has been broken. In general, this separation of oil and water phases may be accomplished by dissolved air flotation (DAF) or chemical precipitation (CP).

In another broad respect, this invention is a method for the treatment of waste-water, which comprises: adding a multifunctional epoxide to a waste-water composition initially in the form of an emulsion and that contains a polyetheramine such that the multifunctional epoxide and the polyetheramine react to form a reaction product, wherein the amounts of epoxide and polyetheramine are used in a quantity sufficient to form an amount of reaction product effective to cause the emulsion to separate into a water phase and an oil phase.

In another broad respect, this invention is a reaction product of a multifunctional epoxide and a polyetheramine.

Advantageously, the polymer that serves to break the emulsion is formed in situ. Also, the composition of this invention is relatively insensitive to polymer concentration, which is a big problem with existing polyamine chemistry.

BRIEF DESCRIPTION OF THE DRAWING

The FIGURE shows a graph of the data from the example.

DETAILED DESCRIPTION OF THE INVENTION

In the practice of this invention, multifunctional epoxides and polyetheramines are employed.

wherein a, b, and c are of values such that the molecular weight of the polyetheramine is from about 150 to 12,000, and in one embodiment a+c=5 and b=39.5.

Suitable polyether blocks of the polyetheramine include polyethylene glycol, polypropylene glycol, copolymers of polyethylene glycol and polypropylene glycol, poly(1,2-butylene glycol), and poly(tetramethylene glycol). The glycols can be aminated using well known methods to produce the polyetheramines. Generally, the glycols are prepared from ethylene oxide, propylene oxide, or combination thereof using well known methods such as by a methoxy or hydroxy initiated reaction. When both ethylene oxide and propylene oxide are used, the oxides can be reacted simultaneously when a random polyether is desired, or reacted sequentially when a block polyether is desired.

In one embodiment of the present invention, the polyetheramines are prepared form ethylene oxide, propylene oxide or combinations thereof. The polyether amines used in the practice of this invention can be prepared using well known animation techniques such as described in U.S. Pat. No. 3,654,370; U.S. Pat. No. 4,152,353; U.S. Pat. No. 4,618,717; U.S. Pat. No. 4,766,245; U.S. Pat. No. 4,960,942; U.S. Pat. No. 4,973,761; U.S. Pat. No. 5,003,107; U.S. Pat. No. 5,352,835; U.S. Pat. No. 5,422,042; and U.S. Pat. No. 5,457,147. Generally, the polyether amines are made by aminating a polyol, such as a polyether polyol with ammonia in the presence of a catalyst such as a nickel containing catalyst such as a Ni/Cu/Cr catalyst.

The multifunctional epoxides used in the practice of this invention have multiple epoxide groups in the molecule. Representative, non-limiting examples of multifunctional epoxides that may be used in the practice of this invention are generally of formula:

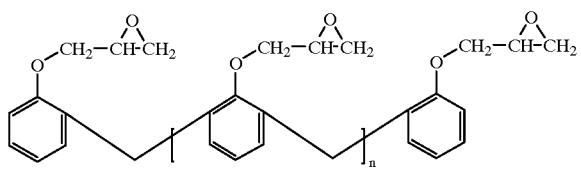

wherein n may vary from 0 to 10, typically from 1 to 4, and more typically is 1. The benzene rings depicted in this figure may be substituted and may alternatively be other aromatic species. The epoxide groups may, individually in each occurrence, be linked by larger alkylene groups than the ethylene groups shown in the formula. In general, prior to reaction with the polyetheramine, the multifunctional epoxide has up to about 120 carbons. In one embodiment, the multifunctional epoxide has a functionality of from 2 to 12. In another embodiment, the multifunctional epoxide has a functionality of from 2 to 6. A variety of epoxy resins can be used as the multifunctional epoxides including bisphenol A-based resins, aliphatic epoxides, cycloaliphatic epoxides, and glycidated Novolacs (given in structure above). A representative, non-limiting example of a suitable multifunctional epoxide that is currently available commercially is EPI-REZ™ 5003-W-55, which is sold commercially as a nonionic aqueous dispersion of an epoxidized bisphenol A novolac resin with an average functionality of 3 (EPON SU-3 type). The EPI-REZ™ 5003-W-55 is stated by the manufacturer (Shell Chemicals) in the product literature to have a viscosity at 25 degrees Centigrade of 5,000 to 15,000 cps (Brookfield RVT, #5 spindle at 10 rpm), 57–59% nonvolatiles, a particle size, number average, of less than or equal to 1.5 microns, a pH of 3–5, and having a weight per epoxide on solids of 195 to 215.

The waste-water to be treated in accordance with this invention includes a wide variety of water from refineries, petroleum plants, chemical plants, ballast waste water, ethylene quench waste water, oil-in-water waste emulsions from oil recovery fields or other industrial fields such as laundry waste water. In the practice of this invention, the waste water is in the form of an emulsion. By emulsion it is meant a stable mixture (suspension) of water and one or more other materials. The composition of the oil phase resulting from the practice of this invention contains organic compound(s) that is immiscible with water. For instance, the oil phase may be made up of petroleum hydrocarbons. A representative sample of such waste water is described in the examples below. Typically, the emulsion is formed through use of a detergent to stabilize the composition. The reaction product of polyetheramine and multifunctional epoxide is thus used to counter and obviate the effects of the detergent.

In one embodiment, this invention is conducted by adding a polyetheramine to a detergent formulation used in a laundry operation. The waste water from the laundry, which is an oil and water emulsion, is collected. The multifunctional epoxide is then added to the waste water. The multifunctional epoxide and polyetheramine, thus contacted, react to form the polymer. The admixture may be heated to accelerate the reaction. In general, the temperature may be from about 20 degrees Centigrade to about 100 degrees Centigrade, and in one embodiment is about 60 degrees Centigrade. Pressures are typically ambient, but higher pressures may be employed. The admixture may optionally be agitated, stirred, or the like. The polymer causes the waste-water emulsion to break. The oil phase is thereafter removed. The reaction may be catalyzed by use of, for instance, ethoxylated tallowamines and ethoxylated ether amines, and also possibly tertiary amine surfactants such as Surfonic™ T-15. The reaction to form the polymer may be conducted in a wide variety of vessels. The particular type of vessel is not critical in the practice of this invention.

A non-limiting, representative reaction scheme is as follows:

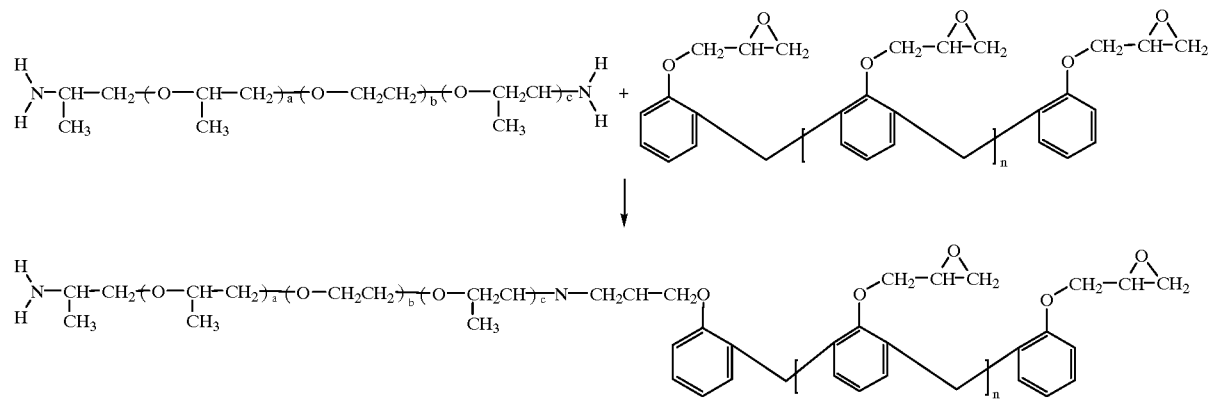

It can be seen that one of the epoxy group reacts with the terminal nitrogen amine to give an amine linkage and a secondary hydroxyl group. The unreacted epoxy groups are capable of reacting with additional amine groups to form a highly branched, high molecular weight polymer. The secondary hydroxyl groups are also capable of reacting with epoxy groups to further increase the molecular weight and branching of the polymer, which is capable of breaking an industrial laundry waste-water emulsion.

The following examples are illustrative of this invention and are not to be construed as limiting the scope of this invention or claims hereto. Unless otherwise denoted, all percentages are by weight.

A five gallon sample of waste-water collected from an industrial laundry was obtained that had been used to clean shop towels and contained approximately 2% petroleum hydrocarbon in the form of an oil in water emulsion. Various amounts of JEFFAMINE® XTJ-502 (the polyetheramine of formula I) were added to the emulsion and dissolved using moderate agitation. To each sample was added an equal amount of EPI-REZ™ 5003-W-55, a nonionic dispersion of a polyfunctional aromatic epoxy resin with an average functionality of three. Each sample was placed in an oven at 60 degrees Centigrade and held for several days. After several days, the samples containing the polymer had separated into three layers. The upper layer contained most of the oil. The middle layer was clear and yellow and the bottom layer consisted of solid material which may be some of the polymer which was formed. The turbidity of the middle layer was determined using a Klett colormeter. As shown in FIG. 1, at 1% polyetheramine (XTJ-502) and higher, the polymer formed in situ broke the emulsion.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as illustrative embodiments. Equivalent elements or materials may be substituted for those illustrated and described herein, and certain features of the invention may be utilized independently of the use of other features, all as would be apparent to one skilled in the art after having the benefit of this description of the invention.

GLOSSARY

JEFFAMINE™ M-1000

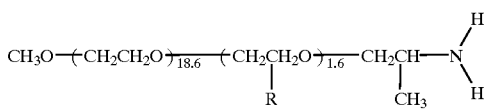

JEFFAMINE™ M-2070 and JEFFAMINE™ M-2005

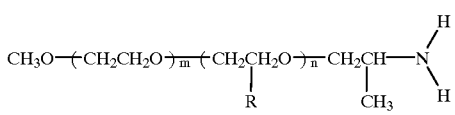

where R=H or $CH_3$, m is from about 3 to 32, and n is from about 10 to 32.

JEFFAMINE™ D-2000, JEFFAMINE™ D-4000 and JEFFAMINE™ D400

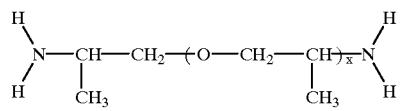

where x is about 33 for D-2000, x is about 68 for D-4000 and x is about 5.6 for D-400.

JEFFAMINE™ ED-600, JEFFAMINE™ ED-900, JEFFAMINE™ ED-2001, JEFFAMINE™ ED4000, and JEFFAMINE™ ED-6000

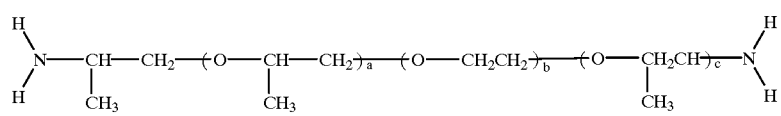

where b is about 8.5 and a+c is about 2.5 for ED-600, b is about 15.5 and a+c is about 2.5 for ED-900, b is about 40.5 and a+c is about 2.5 for ED-2001, b is about 86.0 and a+c is about 2.5 for ED-4000, and b is about 132.0 and a+c is about 3.0 for ED-6000.

JEFFAMINE™ T-3000 and JEFFAMINE™ T-5000

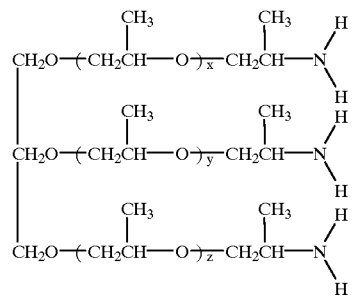

where x+y+z=50 for T-3000 and x+y+z=83 for T-5000.

JEFFAMINE™ ET-3000

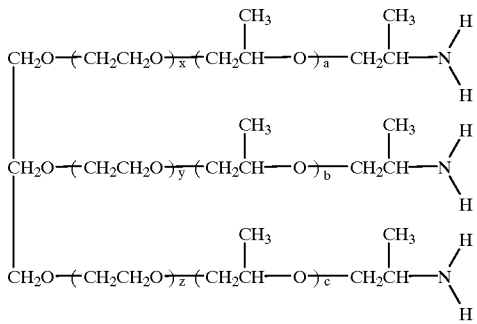

where x+y+z=57 and a+b+c=4.

What is claimed is:

1. A method for the treatment of waste-water, which comprises: reacting a polyetheramine and a multifunctional epoxide in waste-water composition that initially is in the form of an emulsion to form a reaction product that causes the emulsion to break into a water phase and an oil phase.

2. The method of claim 1 wherein the method includes separating the water phase from the oil phase after the emulsion has been broken.

3. The method of claim 1 wherein the multifunctional epoxide has a functionality of from 2to 12.

4. The method of claim 1 wherein the multifunctional epoxide has a functionality of from 2 to 6.

5. The method of claim 1 wherein the emulsion is maintained at a of temperature from about 20 degrees Centigrade to about 100 degrees Centigrade as the emulsion is being broken.

6. The method of claim 1, wherein the multifunctional epoxide is of formula:

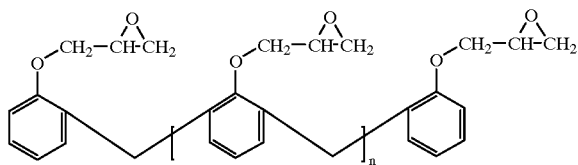

wherein n is from 1 to 4.

7. A method for the treatment of waste-water, which comprises: adding a multifunctional epoxide to a waste-water composition initially in the form of an emulsion and that contains a polyetheramine such that the multifunctional epoxide and the polyetheramine react to form a reaction product, wherein the amounts of epoxide and polyetheramine are used in a quantity sufficient to form an amount of reaction product effective to cause the emulsion to separate into a water phase and an oil phase.

8. The method of claim 7 wherein the method includes separating the water phase from the oil phase.

9. The method of claim 7 wherein the multifunctional epoxide has a functionality of from 2 to 12.

10. The method of claim 7 wherein the multifunctional epoxide has a functionality of from 2 to 6.

11. The method of claim 7 wherein the emulsion is maintained at a of temperature from about 20 degrees Centigrade to about 100 degrees Centigrade as the emulsion is being broken.

12. The method of claim 7 further comprising physically separating the oil phase from the water phase.

13. The method of claim 7, wherein the multifunctional epoxide is of formula:

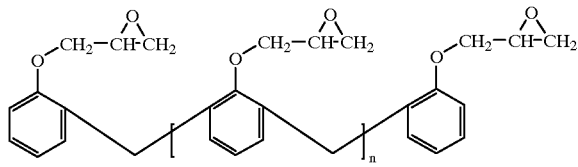

wherein n is from 1 to 4.

* * * * *